United States Patent
Räsänen et al.

(10) Patent No.: US 11,548,257 B2
(45) Date of Patent: Jan. 10, 2023

(54) METHOD AND APPARATUS FOR DEEP-DRAWING A TRAY FROM SHEET MATERIAL

(71) Applicant: Stora Enso OYJ, Helsinki (FI)

(72) Inventors: Jari Räsänen, Imatra (FI); Henry Lindell, Imatra (FI); Kimmo Nevalainen, Kotka (FI); Panu Tanninen, Rauha (FI); Sami Matthews, Lappeenranta (FI); Mari Hiltunen, Imatra (FI); Outi Kylliainen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 833 days.

(21) Appl. No.: 15/034,365

(22) PCT Filed: Oct. 17, 2014

(86) PCT No.: PCT/IB2014/065410
§ 371 (c)(1),
(2) Date: May 4, 2016

(87) PCT Pub. No.: WO2015/063643
PCT Pub. Date: May 7, 2015

(65) Prior Publication Data
US 2016/0288445 A1    Oct. 6, 2016

(30) Foreign Application Priority Data
Nov. 4, 2013   (SE) .................................... 1351301-5

(51) Int. Cl.
*B29C 51/30*    (2006.01)
*B31F 1/00*    (2006.01)
(Continued)

(52) U.S. Cl.
CPC ............ *B31F 1/0077* (2013.01); *B29C 51/08* (2013.01); *B29C 51/082* (2013.01);
(Continued)

(58) Field of Classification Search
CPC ........ B31F 1/0077; B31F 1/00; B31B 50/592; B29C 51/08; B29C 51/082; B29C 51/145; B29C 51/30; B29C 51/306
(Continued)

(56) References Cited

U.S. PATENT DOCUMENTS 3,695,084 A    10/1972   Siemonsen et al.
4,108,941 A *   8/1978   Kermoian ............. B29C 51/082
                                                        264/153
(Continued)

FOREIGN PATENT DOCUMENTS

EP          0082209 A2    6/1983
EP          1985437       10/2008
(Continued)

OTHER PUBLICATIONS

International Searching Authority, International Search Report, PCT/IB2014/065410, dated Feb. 12, 2015.

*Primary Examiner* — Hemant Desai
*Assistant Examiner* — Mary C Hibbert-Copeland
(74) *Attorney, Agent, or Firm* — Greer, Burns & Crain Ltd.

(57) ABSTRACT

The invention relates to a method and an apparatus for deep-drawing a tray (1) from fiber-based sheet material (2), such as polymer coated board. The apparatus comprises a female moulding tool (3), which comprises a cavity (7) for forming the tray bottom outwardly, a male moulding tool (4), which comprises a plunger plate (11) for forming the tray bottom inwardly, the plunger plate being movable with respect to the cavity for forming the tray, and clamps (6, 15)

(Continued)

with an interface for holding the sheet material and forming a tray rim flange. According to the invention by laterally distancing at least one of the moulding tools (3, 4) from the sheet material leeway is provided for free forming of the tray side walls while wrinkling or tearing of the same is avoided. Spacer plates (13) may be positioned behind the plunger plate (11), to adjust its position in relation to the cavity (7) of the female moulding tool (3). The cavity may have a separate bottom plate (8) and spacer plates (9) there below, or screw means may be provided for adjusting the distance of the bottom of the cavity from the clamp interface and thereby varying the depth of the tray.

6 Claims, 2 Drawing Sheets

(51) Int. Cl.
| | | |
|---|---|---|
| | *B29C 51/08* | (2006.01) |
| | *B29C 51/14* | (2006.01) |
| | *B31B 50/59* | (2017.01) |
| | *B31B 110/20* | (2017.01) |
| | *B29K 105/00* | (2006.01) |
| | *B29L 9/00* | (2006.01) |
| | *B29L 31/00* | (2006.01) |

(52) U.S. Cl.
CPC ............ *B29C 51/145* (2013.01); *B29C 51/30* (2013.01); *B29C 51/306* (2013.01); *B31B 50/592* (2018.05); *B31F 1/00* (2013.01); *B29K 2105/256* (2013.01); *B29K 2995/0067* (2013.01); *B29K 2995/0069* (2013.01); *B29L 2009/005* (2013.01); *B29L 2031/712* (2013.01); *B31B 2110/20* (2017.08)

(58) Field of Classification Search
USPC .......................................................... 493/339
See application file for complete search history.

(56) References Cited

U.S. PATENT DOCUMENTS

| | | | | | |
|---|---|---|---|---|---|
| 4,149,841 | A | * | 4/1979 | Patterson | .............. B29C 51/087 |
| | | | | | 425/387.1 |
| 4,246,223 | A | * | 1/1981 | Patterson | .............. B29C 51/087 |
| | | | | | 264/292 |
| 4,609,140 | A | * | 9/1986 | Van Handel | ........... A47G 19/03 |
| | | | | | 229/406 |
| 2002/0086784 | A1 | | 7/2002 | Dai | |
| 2005/0109653 | A1 | | 5/2005 | Wnek et al. | |
| 2013/0043151 | A1 | * | 2/2013 | Bartoli | ................ B65D 77/245 |
| | | | | | 206/229 |
| 2014/0255630 | A1 | * | 9/2014 | Kunihiro | ................ B65D 1/265 |
| | | | | | 428/34.2 |

FOREIGN PATENT DOCUMENTS

| | | | | |
|---|---|---|---|---|
| EP | 1985437 | A2 | 10/2008 | |
| GB | 1553975 | | 10/1979 | |
| JP | 2004154959 | | 6/2004 | |
| JP | 2011530431 | | 12/2011 | |
| JP | 3185366 | | 8/2013 | |
| WO | 2010018306 | | 2/2010 | |
| WO | WO-2010018306 | A1 * | 2/2010 | ....... B29C 45/14336 |
| WO | 2011098886 | | 8/2011 | |
| WO | 2013140034 | | 9/2013 | |

\* cited by examiner

METHOD AND APPARATUS FOR DEEP-DRAWING A TRAY FROM SHEET MATERIAL

This application is a U.S. National Phase under 35 U.S.C. § 371 of International Application No. PCT/IB2014/065410, filed Oct. 17, 2014, which claims priority under 35 U.S.C. §§ 119 and 365 to Swedish Patent Application No. 1351301-5, filed Nov. 4, 2013.

FIELD OF THE INVENTION

This invention relates to a method and an apparatus for deep-drawing a tray from fiber-based sheet material, such as paper, board or polymer-coated board. Use of the tray produced by means of the method or the apparatus is covered by the invention also. The aim is in particular to achieve a shallow paper- or board-based tray, which may form a part of a heat-sealed gas- and liquid-tight food package.

DESCRIPTION OF RELATED ART

Packaging trays are used to a large extent for packages of fresh or readymade foods. The tray may be made of polymer-coated heat-sealable paperboard or cardboard and closed with a heat-sealed polymer film or lid of polymer-coated board. The shelf life of fresh foods is only very short, and a leak proof and air-tight sealing is often required. Some foodstuffs also require a rather stiff packaging tray.

For manufacturing a paper or board tray by deep-drawing, a blank of paper or board is positioned between a male and a female moulding tool, and the moulding tools are then moved in relation to each other, to form the tray, which has a bottom and upwardly expanding side walls surrounding the bottom.

Major problems in turning blanks into containers and trays are tearing of the substrate during drawing and an uneven surface of the upper peripheral rim or flange of the tray due to wrinkling of the board as the tray is formed. Such wrinkles occur especially in the corners of trays of a generally rectangular shape, but also along the side walls and the peripheral flange of circular and oval trays. The wrinkles are a handicap in liquid- and air-tight sealing of the product package, prone to cause leaks between the tray flange and the rim of the lid sealed thereto.

An example of prior art trays and sealed covering lids is found from GB 2 123 786 A. Pressing of polyester coated board material to a tray-formed container has produced corrugations (wrinkles) extending from the corner sidewalls to the rim flange of the tray. A film cover following such irregularities in the flange surface has been heat-sealed to the rim flange to provide a leakproof package.

U.S. Pat. No. 4,026,458 shows a rectangular container deep-drawn from a polymer-coated paperboard blank, wrinkled to have pleated folds in the corner sidewalls and rim flange of the container. The moulding tools for deep-drawing include an upper mandrel and a lower mold, which are movable in relation to each other for drawing the blank to the mold, to adopt the form of the container. Closing of the container is not discussed in U.S. Pat. No. 4,026,458, but obviously a polymer, or polymer-coated lid could be heat-sealed to the rim flange to obtain a sealed package.

EP 1 115 572 B1 is dealing with the potential leaking problem of sealed packages comprising a paper container with bending lines (wrinkles) in the corners and a lid heat-sealed to the annular edge (flange) of the container. The reference suggests use of a coating layer of a minimum thickness able to smooth any unevennesses in the corners and thereby avoid leaks through the wrinkles. Any more detailed teachings of the coating materials and layer thicknesses are missing from the reference, however.

A known approach of dealing with the wrinkling problem is providing the board material with premade score lines, which retract and close up as a blank of the material is turned to a tray. Such score lines may be done by cutting or laser means. U.S. Pat. No. 4,246,223 is an example of prior art using such scoring technique.

FI application 20125304 teaches solving the wrinkle problem by multiplication of side wall step forming at a single or a plurality of working steps, thus moulding the side walls of the tray to have a concentrically stepped profile around the tray bottom. The solution, in a way, is to cut the upward deformation line that would otherwise produce the wrinkles into pieces short enough to let the paper adapt to the bending force without wrinkling. The length of such pieces, or the height of the steps in the tray side walls, could vary according to the paper material being used, but for usual paperboards or cardboards would be of the order of about 6 mm at maximum.

A further problem of prior art moulding tools is that as the size of the tray is varied, each size requires tools of its own, without adaptability to e.g. different depths of the tray. The same applies to the thickness of the sheet material being used; changing the material thickness forces a change of the working tools also.

In the prior art WO 2010/018306 describes a moulding tool system, in which the depth of a board based container may be changed by detachably attaching to the mould cavity of the female moulding tool an insert, which forms a new bottom for the cavity and thus reduces the cavity depth and the depth of the container being formed accordingly.

OBJECTS AND SUMMARY OF THE INVENTION

The present invention is aimed at solving the problems described herein by means of a novel method and apparatus for forming a fiber-based tray by deep-drawing.

The method according to the invention comprises:
(i) bringing the sheet material between a female moulding tool, which comprises a cavity for forming the tray bottom outwardly, and a male moulding tool, which comprises a plunger plate for forming the tray bottom inwardly,
(ii) clamping the sheet material along the circumference of the female and male moulding tools, to hold the material during the deep-drawing step, and
(iii) moving the plunger plate with respect to the cavity for forming the tray, while between the cavity bottom and the clamp interface at least one of the male and female moulding tools is laterally distanced from the sheet material to allow free forming of unwrinkled side walls for the tray.

The apparatus according to the invention, for deep-drawing a tray from fiber-based sheet material, comprises
(i) a female moulding tool, which comprises a cavity for forming the tray bottom outwardly,
(ii) a male moulding tool, which comprises a plunger plate for forming the tray bottom inwardly, the plunger plate being movable with respect to the cavity for forming the tray, and
(iii) clamps with an interface for holding the sheet material and forming a tray rim flange, while within a vertical span between the cavity bottom and the clamp interface the male and female moulding tools are laterally distanced from each other to allow free forming of the side wall of the tray.

According to the invention emergence of wrinkles in the tray side walls and rim flanges is prevented by distancing between the cavity bottom and the clamp interface at least one of the male and female moulding tools laterally from the sheet material, so as to allow free forming of the side wall of the tray. For instance, the male moulding tool may comprise spacer plates positioned behind the plunger plate and laterally distanced from the sheet material and thus leave free open space inside of the tray side wall being formed. Preferably both the male and the female moulding tools are laterally distanced from the sheet material so as to leave free open space to both sides of the tray side wall being formed.

The advantage of the above embodiments is that the surfaces of the moulding tools are not snugly fitted to the thin sheet material as usual, forcibly stretching the material and causing tears to emerge, but the open space allows the sheet material to adapt to moulding without tears and wrinkles and ensuing problems to leak-free sealing to packages.

Use of spacer plates to distance the male moulding tool from the sheet material also allows adjustment of the position of the plunger plate in respect of the female moulding tool. By making even the cavity of the female moulding tool adjustable, the depth of the tray that is being formed may be varied.

According to an embodiment of the invention the female moulding tool has a cavity bottom plate, which can be raised by means of spacer plates installed below said bottom plate. The depth of the tray may thus be increased by adding spacer plates to the male moulding tool and by removing spacer plates from the female moulding tool, i.e. from below the bottom plate, accordingly. Naturally, the opposite shall be done when the depth of the tray is decreased.

According to another embodiment of the invention in the female moulding tool at least one screw is provided to adjust the distance to the clamp interface. Such a screw thus replaces the above-mentioned spacer plates below the bottom plate. The screw may connect the cavity bottom to a clamp on the underside of the tray rim flange. In this way the apparatus may be easily and precisely adapted to small differences in the thickness of the sheet material without a need of adding or removing any parts from the construction.

The fiber-based sheet material used for the invention may be paper, paperboard or cardboard. Such fiber-based material may be uncoated or provided with a polymer coating on one or both sides. Metal-foiled paper or board, possibly polymer-coated, is another alternative.

The invention is particularly useful in the production of thin (low-depth) sealed tray packages for cold cuts of meat, fish, cheese and other sliced foods. Deep-drawing of the tray may be performed at a single step, producing unwrinkled trays of a depth well over 6 mm, which is the upper limit given in FI 20125304.

BRIEF DESCRIPTION OF THE DRAWINGS

The invention is illustrated by way of examples depicted in the drawings, in which.

DETAILED DESCRIPTION

The apparatus shown in the figures forms a packaging tray 1 from a blank of sheet material 2 by a deep-drawing operation. The sheet material is preferably polymer coated board or paper, but may also be metal-foiled board or paper, possibly with an additional coat of polymer, uncoated board or paper or polymer sheet or film.

Figure 1:
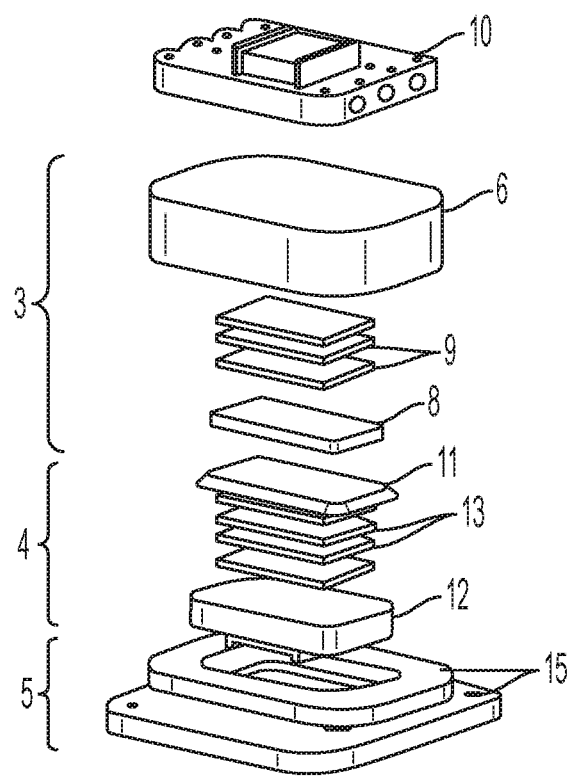
FIG. 1 shows an apparatus according to the invention in an exploded view.
Figure 2:
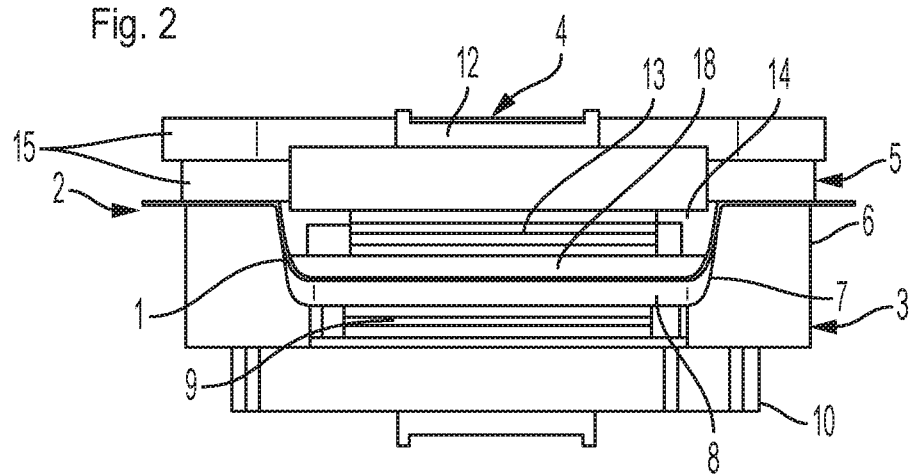
FIG. 2 shows a blank of sheet material drawn to a tray in the apparatus of FIG. 1.

The apparatus as seen in FIGS. 1 and 2 comprises as its main parts a female moulding tool 3 for shaping the tray from its outside, a male moulding tool 4 for shaping the tray from its inside, and clamping means 5 for holding the blank of sheet material during the deep-drawing operation and forming a rim flange to the tray.

The female moulding tool 3 comprises a frame 6 with a cavity 7, which generally corresponds to the shape of the tray 1 being formed. In the embodiment shown in FIGS. 1 and 2 there is a separate bottom plate 8 installed in the cavity 7, which may be raised by means of spacer plates 9 for reducing the depth of the tray being formed. The spacer plates 9 may be removed, however, so that the bottom plate 8 will be level with the bottom of the cavity 7, so that the shape and the depth of the tray 1 are determined by the frame 6 alone.

Below the frame 6 of the female moulding tool 3 there is provided a heating unit 10.

The male moulding tool 4 comprises a plunger plate 11 for forming the bottom of the tray 1 from its inside, a body part 12, which is movable with respect to the female moulding tool 3, which is preferably held stationary during the deep-drawing operation. A number of spacer plates 13 have been positioned between the plunger plate 11 and the body part 12 in order to distance the former from the latter. By vertical movement of the male moulding tool 4 the plunger plate 11 presses the blank 2 of sheet material into the cavity 7 of the female moulding tool 3, to adapt the material to the shape determined by the bottom plate 8 and the side walls of the cavity.

A specific feature of the spacer plates 13 of the male moulding tool 4 is that they are narrower that the horizontal cross-section of the tray 3, so that a free space 14 surrounding the pack of plates 13 is left between the plates and the tray side walls being formed. In this way free forming of the tray side walls is allowed, thus avoiding tearing of the sheet material and wrinkling of the corners of the tray.

The clamping means 5 comprise frames 15, which surround the body part 12 of the male moulding tool 4 and are vertically movable independently of the latter. In the embodiment of FIGS. 1 and 2 the frames 15 form an upper clamping tool, whereas the frame 6 of the female moulding tool 3 serves as a lower clamping tool. The clamping tools 15, 6 have a mutual interface, which holds the rim of the blank 2 in place during the clamping operation and thus forms a flat rim flange to the tray 1 being formed.

The apparatus of FIGS. 1 and 2 is worked by first adjusting the location of the bottom plate 8 of the female moulding tool 3 to correspond to the desired depth of the tray 1 by installing a corresponding number of spacer plates 9 there below. Then a blank 2 of sheet material such as polymer coated paperboard is brought between the female and male moulding tools 3, 4, which together with the clamping means 5 stand distanced from each other. The clamping frames 15 are then brought against the frame 6 of the female moulding tool 3 so as to clamp the rim of the blank 2 into place for the deep-drawing operation. Finally the body part 12 of the male moulding tool 4, together with the plunger plate 11 and spacer plates 13, is moved downwards with the plunger plate entering the cavity 7 and pressing the blank 2 against the bottom plate 8 of the female moulding tool 3. The bottom of the tray 3 will conform to the form of the plunger plate 11, while the sides of the tray have leeway to form freely, adapt a slightly wavy configuration, and thus avoid wrinkling or tearing. Especially as the blank is not scored or creased beforehand, i.e. it is unscored and/or uncreased, and the rim of the blank is held clamped between the clamping tools 15, 6, perfectly flat rims of the finished tray are secured, which then avoids the leaking problems as the tray is closed with a heat-sealed covering film or lid.

Figure 3:
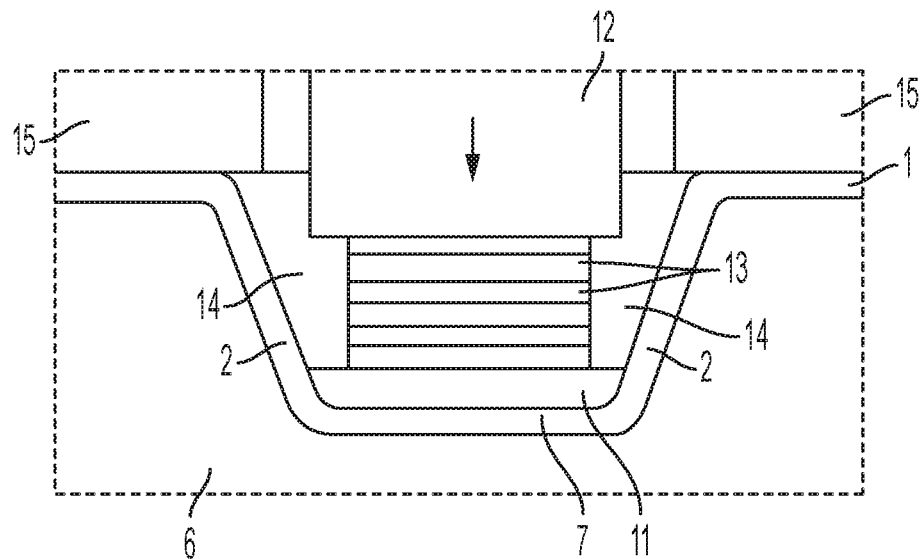
FIG. 3 shows a deep-drawn tray and parts of the apparatus according to another embodiment of the invention.

The embodiment of FIG. 3 is a simplification of that of FIG. 2 in that there are no separate bottom plate and spacer plates in the female moulding tool 3, but the cavity 7 in the latter alone determines the overall shape and depth of the tray 1 that is being formed. The plunger plate 11 and spacer plates 13 of the male moulding tool 4 are similar to those in FIGS. 1 and 2. The same applies to the clamping means 15 as well.

Figure 4:
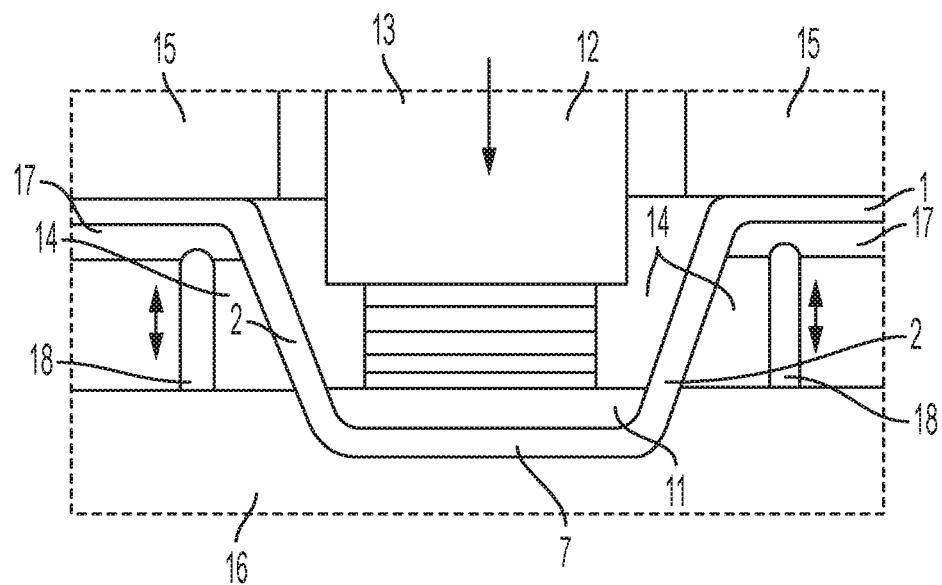
FIG. 4 shows a deep-drawn tray and parts of the apparatus according to a third embodiment of the invention.

The embodiment of FIG. 4 comprises a male moulding tool 4 and upper clamping means similar to those in the previous embodiments of FIGS. 2 and 3. The female moulding tool 3 is different, however. There is a bottom frame part 16, which has a cavity 7 shaped to correspond to the bottom of the tray 1 being formed. A lower clamping frame 17 is connected to the bottom frame part 16 through threaded screws 18, which are used to precisely adjust the distance between the parts 16, 17 and thereby the depth of the finished tray 1. A further significant feature is that there is ample free space on both sides of the tray side walls, thus enhancing the leeway for free forming of the side walls.

In view of the above detailed description of the present invention, other modifications and variations will become apparent to those skilled in the art. However, it should be apparent that such other modifications and variations may be effected without departing from the spirit and scope of the invention.

The invention claimed is:

1. A method of deep-drawing a tray from fiber-based sheet material, the method comprising the steps of:
 (i) bringing the sheet material between a female moulding tool, which comprises a cavity for forming a tray bottom outwardly, and a male moulding tool, which comprises a plunger plate for forming the tray bottom inwardly,
 (ii) clamping the sheet material along the circumference of the female and male moulding tools and a rim of the sheet material by clamping means, to hold the sheet material during the deep-drawing step at a clamping interface,
 (iii) deep-drawing the tray by moving the plunger plate with respect to the cavity and pressing the plunger against the sheet material, such that the plunger plate presses against the sheet material only after the sheet material has been clamped in step ii), and
 (iv) wherein the female and male moulding tools are arranged so that a surface of the male moulding tool is laterally distanced from the sheet material and forms a free space, between the clamping interface and the male plunger plate, through an end of the plunger plate movement to allow free forming of unwrinkled side walls for the finished deep-drawn tray in the free space,
  wherein a distance between the cavity bottom and the clamp interface is adjusted to correspond to a selected depth of the tray,
  wherein one or more spacer plates are inserted to adjust the vertical position of the plunger plate such that the plunger plate is between the one or more spacer plates and the cavity bottom.

2. The method of claim 1, wherein both the male and the female moulding tools are distanced from the sheet material so as to leave free open spaces on both sides of the tray side wall being formed.

3. The method of claim 1, wherein the vertical position of the cavity bottom is adjusted by means of at least one screw connecting the cavity bottom to a clamp on the underside of the tray rim flange.

4. The method of claim 1, wherein said spacer plates are laterally distanced from the sheet material to leave the free space inside of the tray side wall being formed.

5. The method of claim 1, wherein the female moulding tool has a cavity bottom plate, the vertical position of which is adjusted by means of spacer plates.

6. The method of claim 1, wherein unscored and/or uncreased sheet material is formed into trays having unwrinkled side walls and rim flanges.

* * * * *